United States Patent [19]

Okada et al.

[11] Patent Number: 4,899,541
[45] Date of Patent: Feb. 13, 1990

[54] AXLE DRIVING APPARATUS

[75] Inventors: Hideaki Okada, Takarazuka; Koichiro Fujisaki, Kobe, both of Japan

[73] Assignee: Kanzaki Kokyukoki Mfg. Co. Ltd., Japan

[21] Appl. No.: 315,306

[22] Filed: Feb. 24, 1989

[30] Foreign Application Priority Data

| Mar. 1, 1988 | [JP] | Japan | 63-48344 |
| Mar. 18, 1988 | [JP] | Japan | 63-36574[U] |
| Apr. 18, 1988 | [JP] | Japan | 63-51708[U] |

[51] Int. Cl.[4] .......................... F16D 39/00
[52] U.S. Cl. ........................ 60/464; 60/487; 180/307
[58] Field of Search .......... 60/464, 494, 487, 490, 60/453, 454, 484, 485; 91/505; 180/305, 307, 53.1, 53.4

[56] References Cited

U.S. PATENT DOCUMENTS

| 3,131,539 | 5/1964 | Creighton et al. ............... 60/487 |
| 3,270,826 | 9/1966 | Middlesworth et al. ....... 180/305 X |
| 3,430,438 | 3/1969 | Weiss . |
| 3,687,212 | 8/1972 | Forster . |
| 3,902,567 | 9/1975 | Pekar, Jr. ..................... 180/305 |
| 3,944,010 | 3/1976 | Winter et al. . |
| 4,627,237 | 12/1986 | Hutson . |
| 4,781,259 | 11/1988 | Yamaoka et al. ............ 180/305 X |

FOREIGN PATENT DOCUMENTS 3239223 10/1982 Fed. Rep. of Germany .

*Primary Examiner*—Edward K. Look
*Attorney, Agent, or Firm*—Saidman, Sterne Kessler & Goldstein

[57] ABSTRACT

An axle driving apparatus which fixes a hydraulic pump and a hydraulic motor constituting a hydrostatic transmission to one of laterally dividable transmission casings, and provides check valves capable of sacking operating oil used in the hydrostatic transmission and also used as lubricating oil in the transmission casing, so that both the check valves are open to allow the hydraulic motor to freely rotate when the apparatus hauls a tractor, the transmission casing and hydrostatic transmission being compact to be disposed.

7 Claims, 8 Drawing Sheets

AXLE DRIVING APPARATUS

FIELD OF THE INVENTION

The present invention relates to an axle driving apparatus with a hydrostatic transmission used as a driving apparatus for a tractor.

DESCRIPTION OF THE PRIOR ART

The prior art of laterally dividing a transmission casing for driving the axles, supporting the axles to the transmission casing, and housing therein a hydrostatic transmission, is well known as disclosed in, for example, the U.S. Pat. Nos. 3,687,212, 3,430,438 or West German Pat. DE No. 3239223A1.

SUMMARY OF THE INVENTION

In the prior art, a hydraulic motor and a hydraulic pump constituting the hydrostatic transmission are disposed within the transmission casing, but supports and oil passages for connecting both the motor and pump, a valve making free the rotation of hydraulic motor when hauling the tractor, and a supply unit for an operating oil when reduced in the hydrostatic transmission in a closed circuit.

An object of the invention is to provide an axle driving apparatus which is so constructed that the hydraulic pump and hydraulic motor constituting the hydrostatic transmission are fixedly supported to one of laterally divided transmission casings, the operating oil used for the hydrostatic transmission is used also as lubricating oil in the transmission casing, check valves capable of taking in the lubricating oil when the operating oil in the closed circuit of the hydrostatic transmission decreases, and both the check valves can be open, thereby allowing the hydraulic motor to freely rotate when hauling the tractor.

Also, the hydrostatic transmission is made compact to be housed in the transmission casing.

Other and further objects and advantages of the invention will be apparent from the following description taken in connection with the accompanying drawings.

DESCRIPTION OF THE PREFERRED EMBODIMENT

Figure 1:
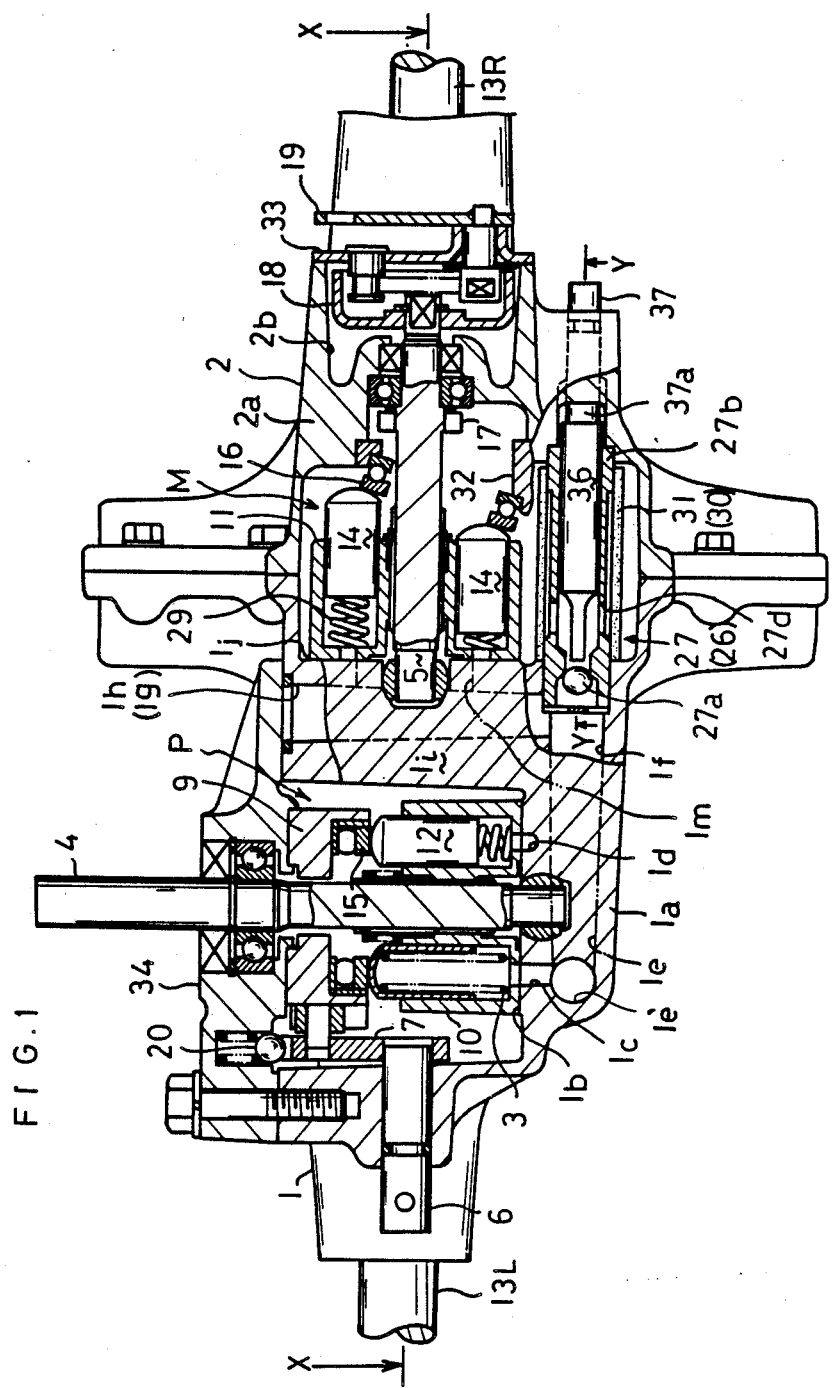
FIG. 1 is a sectional rear view of an embodiment of an axle driving apparatus of the invention.
Figure 2:
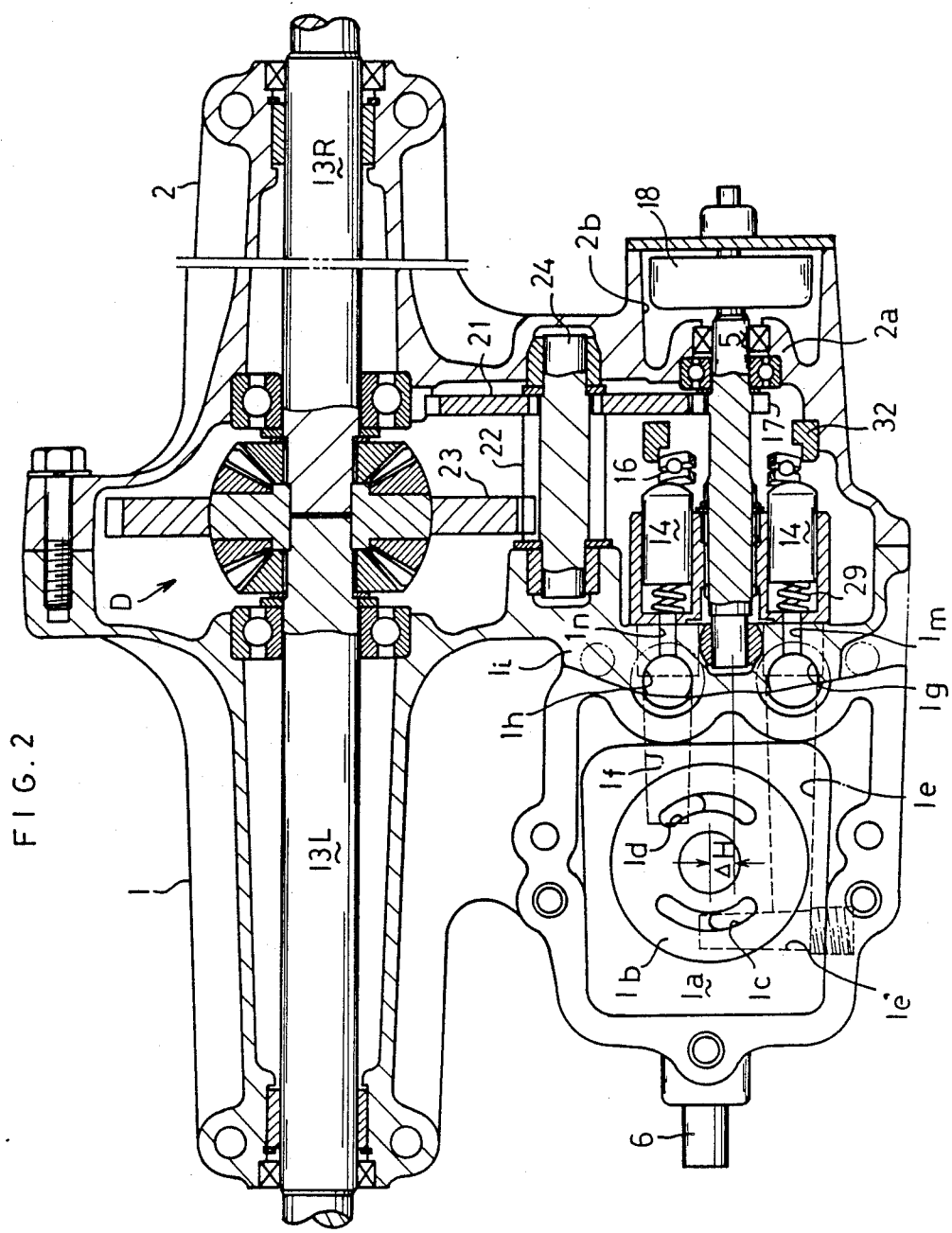
FIG. 2 is a sectional view taken on the line X—X in FIG. 1.

In an embodiment of an axle driving apparatus of the invention shown in FIGS. 1 through 4, A transmission casing for an axle driving apparatus is divided into a transmission casing 1 at one side and that 2 at the other side, a hydraulic pump P and a hydraulic motor M are fixedly supported to the transmission casing 1 at one side, axles 13L and 13r are journalled to the transmission casing 1 at one side and that 2 at the other side respectively, and a differential gear D is disposed at the junction between the transmission casings 1 and 2.

In other words, a pump mounting surface $1b$ is formed at the bottom wall $1a$ of the transmission 1, crescent-shaped oil passages $1c$ and $1d$ are bored at the pump mounting surface $1b$, and a pump shaft 4 is erected at the center of the pump mounting surface $1b$.

A cylinder block 10 is fitted onto the pump shaft 4, pistons 12 housing therein springs 3 and biased thereby respectively are fitted into the cylinder block 10 around the pump shaft 4, and the pistons 12 abut at the upper ends against a thrust bearing 15 which is fixed to a movable swash plate 9.

The movable swash plate 9 is changed in a tilted angle by rotation of an arm 7 projecting from a speed change lever shaft 6, thereby changing a discharge amount and the discharge direction of pressure oil.

A lid 34 covers the movable swash plate 9 and supports the upper portion of pump shaft 4. A detent 20 is provided at the lower surfaces of the lid 34 and fitted into a recess provided at the arm 7, thereby holding a hydrostatic transmission in the neutral position.

Accordingly, when the pump shaft 4 rotates, the cylinder block 10 rotates so that each piston 12 slides corresponding to inclination of the movable swash plate 9, thereby taking in or discharging operating oil through the crescent-shaped oil passages $1c$ and $1d$.

A vertical wall $1i$ is erected adjacently to the bottom wall $1a$, a motor mounting surface $1j$ is provided at the surface of the vertical wall $1i$ on which the other side transmission casing 2 is mounted, and between the central portion of the motor mounting surface $1j$ and a vertical wall $2a$ of the transmission casing 2 at the other side is horizontally mounted, a motor shaft 5 extending i parallel to the axles 13L and 13R and shifting at the axis by $\Delta H$ from the pump shaft 4 when viewed from above.

A cylinder block 11 is fitted onto the motor shaft 5, pistons 14 biased by springs 29 are fitted into the cylinder block 11 respectively, and the utmost end of each piston 14 abuts against a thrust bearing 16 fixed to a fixed swash plate 32.

At the bottom wall $1a$ are formed horizontal oil passages $1e$ and $1f$ tapered from the transmission casing 2 toward the transmission casing 1, the oil passage $1f$ directly communicates with the crescent-shaped oil passage $1d$ on the pump mounting surface $1b$, and that $1e$ communicates with the crescent-shaped oil passage $1c$ through an oil passage $1e'$ perpendicularly bored when viewed from above.

Figure 3:
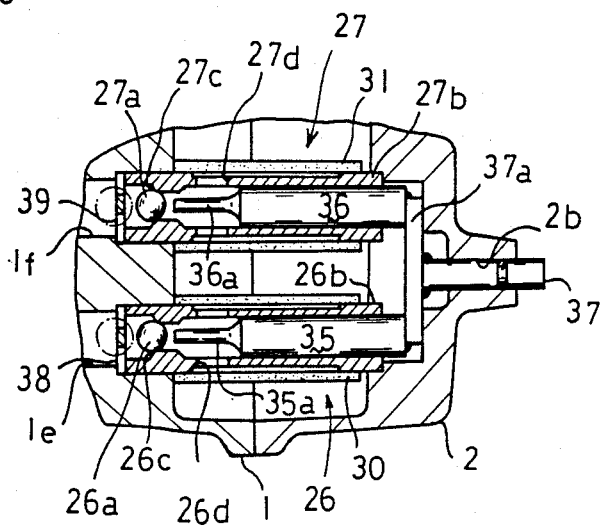
FIG. 3 is a sectional view taken on the line Y—Y in FIG. 1.
Figure 4:
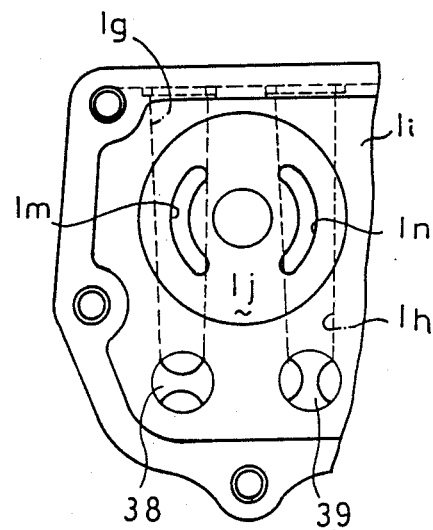
FIG. 4 is a sectional side view of a motor mounting portion.

Check valves 26 and 27 are, as shown in FIG. 3, provided at the open ends of the horizontal oil passages $1e$ and $1f$ facing the transmission casing 2, and comprise valve bodies $26a$ and $27a$ and valve holders $26b$ and $27b$ respectively.

The valve holders $26b$ and $27b$ are hollow-pipe-like-shaped, valve seats $26c$ and $27c$ are formed inside the oil passages 1e and 1f, and the valve bodies 26a and 27a abut against the valve seats 26c and 27c respectively.

Snap rings 38 and 39 for the valve bodies 26a and 27a are interposed between the vertical wall 1i and the valve holders 26b and 27b respectively.

Valve pushers 35 and 26 are slidably inserted into the valve holders 26b and 27b and reduced in diameter at one ends 35a and 36a at the valve seats 26c and 27c sides, so that the one ends 35a and 36a push the valve bodies 26a and 27a away from the valve seats 26c and 27c, thereby enabling the check valves 26 and 27 to be open respectively.

The valve pushers 35 and 36 abut at the other ends thereof against an urging portion 37a at a T-like-shaped control lever 37, which is, when a vehicle provided with the hydrostatic transmission is hauled, pushed to open the check valves 26 and 27 so as to discharge the pressure oil to facilitate rotation of the motor shaft 5 not to apply a load to the hydrostatic transmission.

The valve holders 26b and 27b positioned around the utmost ends 35a and 36a of valve pushers 35 and 36 are provided at the side walls with suction ports 26d and 27d for lubricating oil, and filters 30 and 31 are fitted onto the valve holders 26b and 27d, so that when the horizontal oil passages 1e and 1f is of negative pressure and the check valves 26 and 27 are open, the lubricating oil is filtered and supplied to the hydrostatic transmission as operating oil therefor.

At the vertical wall 1i is bored oil passages 1g and 1h tapered downwardly from the upper surface of the vertical wall 1i, the oil passages 1g and 1h communicating at the lower ends with the oil passages 1e and 1f and at the lateral sides on the half way with crescent-shaped oil passages 1m and 1n bored on the motor mounting surface 1j respectively, and the upper openings of the oil passages 1g and 1h are covered with a lid 34.

Accordingly, the oil passages 1c and 1d communicate with the oil passages 1m and 1n through the oil passages 1e and 1f horizontally bored at the bottom wall 1a and those 1g and 1h vertically bored at the vertical wall 1i respectively, so that the pressure oil from the hydraulic pump P enters into the piston 14 through the oil passages 1c, 1e', 1e, 1g and 1m, and the cylinder block 11 is rotated to return the oil from the piston 14 to the piston 12 at the hydraulic pump 4 through the oil passages 1n, 1h, 1f and 1d.

Thus, the pressure oil is sent from the hydraulic pump P toward the hydraulic motor M and vice versa, so as to push the piston 14 to rotate the motor shaft 5.

Accordingly, operating oil in the hydrostatic transmission, when reduced, is automatically supplied therein by the check valves 26 and 27.

The rotation of motor shaft 5 is transmitted to a large diameter gear 21 on a counter shaft 24 from a gear 17 provided on the motor shaft 5, so that a driving force is transmitted from a smaller diameter gear 22 provided on the counter shaft 24 to a ring gear 23 at the differential gear D, thereby driving the axles 13L and 13R laterally projecting therefrom.

A brake drum 18 is fixed to the end of the motor shaft 5 projecting into an opening 2b of the transmission casing 2 and a brake arm 19 pivotally supported to a lid 33 is turned to contact brake shoes with the brake drum to exert the braking action as well known.

The oil passages 1e, 1e', 1f, 1g and 1h are formed and downwardly tapered by extract-casting and together with the transmission casing 1 when molded, thereby requiring no particular working, such as drilling.

Especially, the vertical oil passages 1g and 1h are tapered by extract-casting, and the lid 34 for pivotally supporting the upper portion of the pump shaft 4 of the hydraulic pump P disposed at the bottom wall 1a is disposed at the upper end face of the vertical wall 1i to thereby close the opening ends of oil passages 1g and 1h.

Therefore, the upper openings of the vertical oil passages 1g and 1h caused by the extract-casting can be closed by the lid 34, thereby not requiring a separate blind plug.

Next, explanation will be given on a modified embodiment of the invention shown in FIGS. 5 through 11.

This embodiment is different from the aforementioned embodiment in check valves 26 and 27, a control lever 37 and a fixed swash plate 32.

Valve holders 26b and 27b are mounted in open ends of horizontal oil passages 1e and 1f at the other transmission casing 2, threaded at the outer peripheries of inserted utmost ends so as to screw with the horizontal oil passages 1e and 1f, and provided between the outer peripheries at the opening sides and the horizontal oil passages 1e and 1f with gaps so as to form oil passages 1p and 1q respectively, and suction ports 26d and 27d are bored from the axles of the threaded portions of the valve holders 26b and 27b to the oil passages 1p and 1q at the outer peripheries of valve holders 26b and 27b respectively.

Valve pushers 35 and 36 slidably perforate the axles of the valve holders 26b and 27b and are formed at the utmost ends in valve bodies 26a and 27a, and valve seats 26c and 27c are closed, thereby closing the ends of suction ports 26d and 27d to form check valves 26 and 27.

The valve pushers 35 and 36 project at the other ends thereof into the transmission casing 2 through the openings of horizontal oil passages 1e and 1f respectively.

At the transmission casing 1 and between the horizontal oil passages 1e and 1f is provided a spring containing recess 1k, into which a coil spring 21 is inserted.

A T-like-shaped control lever 37 is pivotally supported to the transmission casing 2 at the position thereof opposite to the spring containing recess 1k and an urging portion 37a across the valve pushers 35 and 36 is fixed to the utmost end of the control lever 37 and biased by the coil spring 21.

A space A, into which the urging portion 37a is inserted, is tightly sealed by ribs 1r and 2d level with the junction surface of the transmission casing 1 and the transmission casing 2, the rib 2d at the transmission casing 2 being cutout in part so that a plate-like filter 2 is held to the cutout. Reference numeral 2b designates an insertion bore for the T-like-shaped control lever 37.

Hence, the crescent-shaped oil passages 1c and 1d on the pump mounting surface 1b communicate with the crescent-shaped oil passages 1m and 1n on the motor mounting surface 1j through the horizontal oil passages 1e and 1f bored at the bottom wall 1a and vertical oil passages 1g and 1h bored at the vertical wall 1i, so that pressure oil from the hydraulic pump P enters into the piston 14 through one oil passage to rotate a cylinder block 11 and returns to the piston 12 at the hydraulic pump P from the piston 14 through the oil passages at the other side.

When the operating oil in the hydrostatic transmission leaks to reduce pressure more than that in the transmission casing, the valve bodies 26a and 27a are open to supply the operating oil from the space A into the hydrostatic transmission.

When the apparatus hauls a vehicle, the T-like-shaped control lever 37 is depressed to open the valve bodies 26a and 27a to extract the pressure oil, thereby facilitating the rotation of motor shaft 5 and applying no load onto the hydrostatic transmission.

Figure 5:
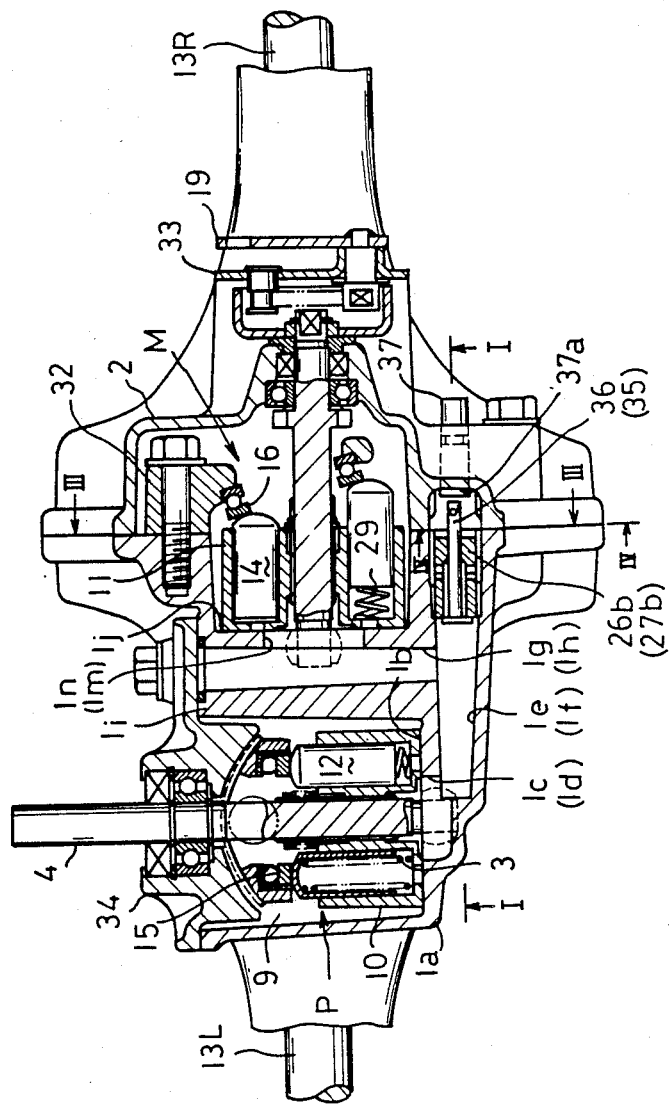
FIG. 5 is a sectional rear view of a modified embodiment of an axle driving apparatus of the invention.
Figure 6:
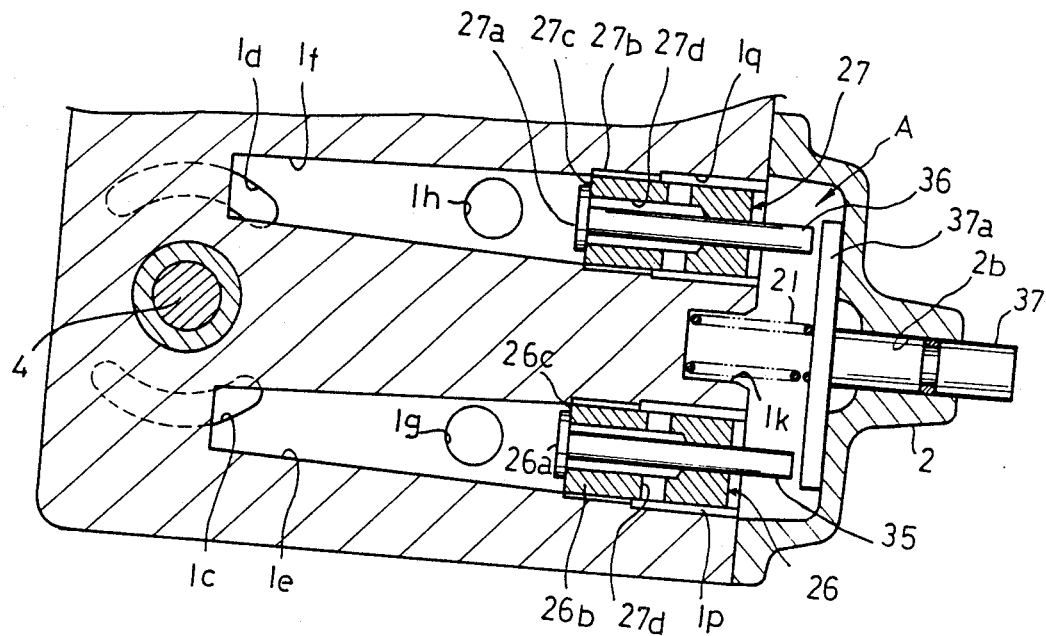
FIG. 6 is a sectional view taken in the line I—I in FIG. 5, looking the direction of the arrow.
Figure 7:
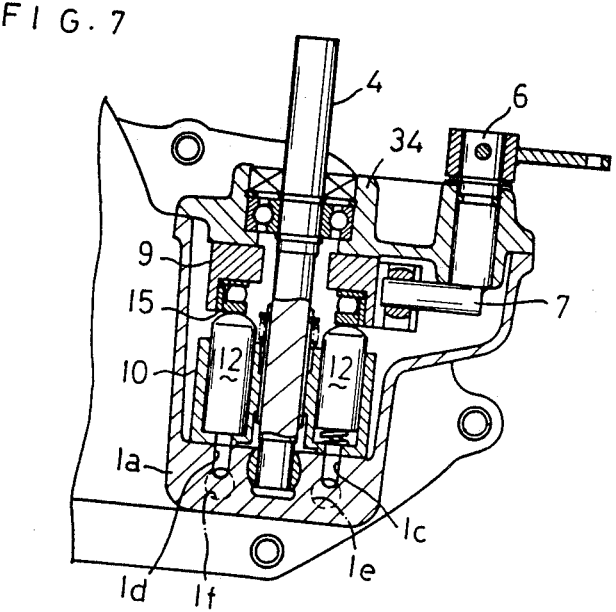
FIG. 7 is a sectional view of a hydraulic pump in the FIG. 5 embodiment.
Figure 8:
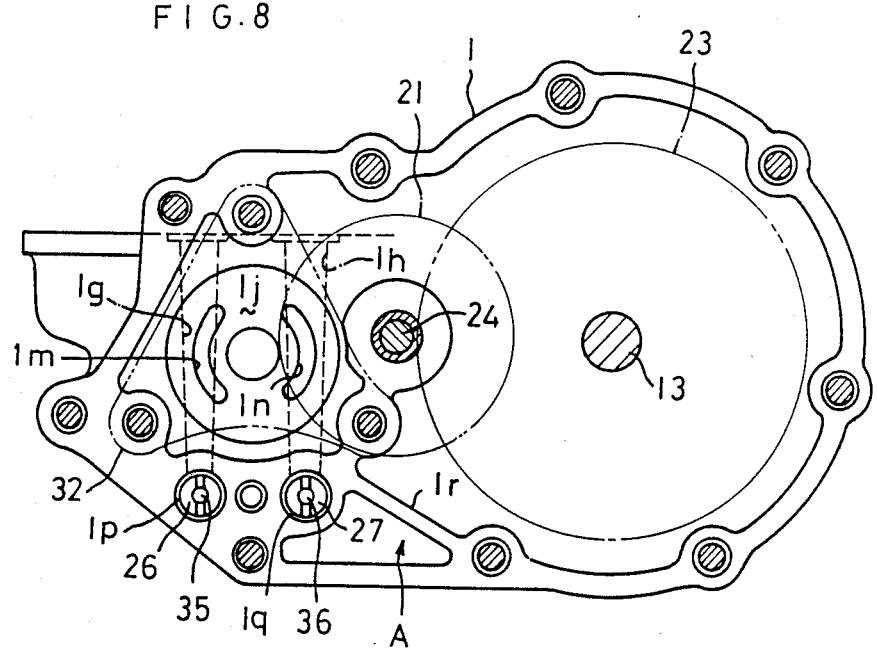
FIG. 8 is a sectional view taken on the line III—III in FIG. 5, looking in the direction of the arrow.
Figure 9:
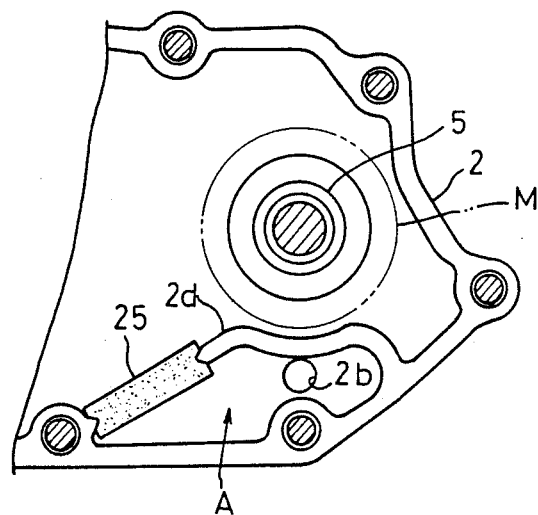
FIG. 9 is a sectional view taken on the line IV—IV in FIG. 5, looking in the direction of the arrow.
Figure 10:
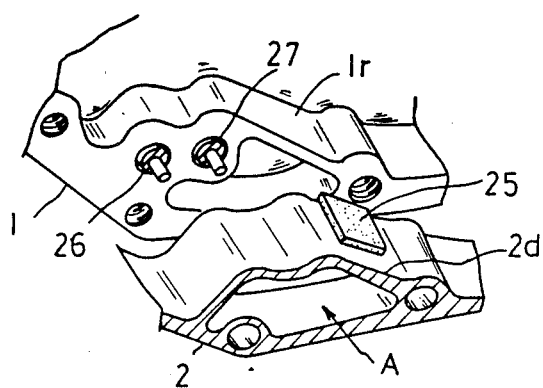
FIG. 10 is a perspective view of a junction of a transmission casing at one side and that at the other side in the FIG. 5 embodiment.
Figure 11:
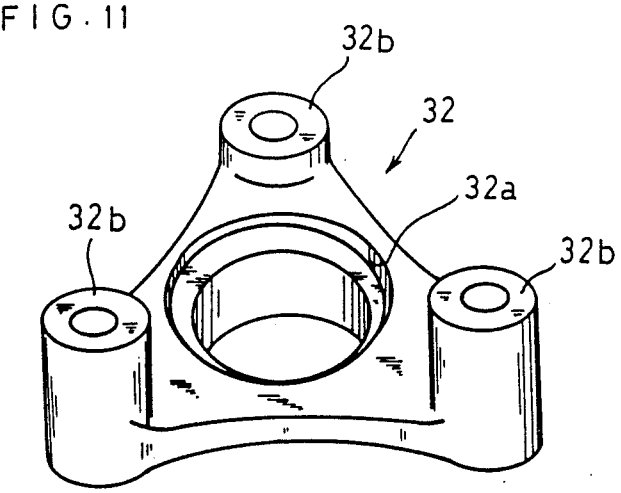
FIG. 11 is a perspective view of a fixed swash plate in the same.

Next, explanation will be given on construction of the fixed swash plate 32 with reference to FIGS. 5, 8 and 11.

The utmost end of each piston 14 of the hydraulic motor M abuts against a thrust bearing 16 held by the fixed swash plate 32.

The fixed swash plate 32 is provided at the center of a triangular receiving surface with a bore 32 into which the thrust bearing 16 is fitted, and projects at the three vertexes of the triangular surface to form legs 32b, thereby being fixed to the junction surface of the transmission casings 1 and 2 through bolts.

As seen from the above, the axle driving apparatus of the invention has the following advantages:

Since the hydrostatic transmission for driving the axles is housed in the transmission casing, there is no need of providing the space for fixing the hydrostatic transmission outside the transmission casing as conventional, whereby the apparatus can be small-sized and lightweight.

Since the oil passages for the hydraulic pump and hydraulic motor are directly formed in the wall of transmission casing not to require an oil passage plate, whereby the axle driving apparatus can be small-sized as a whole and be enough to provide a smaller mounting space to be mounted therethrough to the body of the tractor.

In spite that the pump shaft is perpendicular to the axle, a bevel gear is not interposed and the oil passages formed at the transmission casing are turned perpendicularly, whereby the power transmitting direction to the hydraulic motor can be changed perpendicularly. Also, for a light track loading an engine of vertical crank shaft, the pulleys and belt are used to enable the power to be simply applied to the hydraulic pump.

Since the lid 34 is disposed at the upper end face of the vertical wall 1i to close the open ends of the oil passages 1g and 1h, the oil passages 1g and 1h can be formed by extract-casting, thereby not requiring a separate blind plug.

The valve holders 26b and 27b, suction ports 26d and 27d, and valve bodies 26a and 27a, are provided to constitute the check valves 26 and 27 at the open end of the horizontal oil passages, whereby the check valves can be substituted for the plugs not to require a new oil passage for each check valve.

Since the suction ports 26d and 27d at the valve holders 26b and 27b are covered by the filters 30 and 31, thereby enabling a space for each filter to be omitted and disposing them at a low cost.

The rib 2d is provided at the other transmission casing 2 to close-contact with the wall surface of the transmission casing 1 and the filter is held at a cutout of rib to guide operating oil into the rib 2 through the filter, whereby the sealed space is formed when the casings are coupled and the rib is cutout in part to hold the filter, thus using the filter simple in construction to reduce the manufacturing cost and simply forming the filter holding portion.

Since the valve pushers 35 and 36 are slidably provided in the valve holders 26b and 27b and the urging plate 37a and the control lever are slidably provided at the other transmission casing as above-mentioned, whereby the pusher opens the check valves 26 and 27 to be usable also as a bypass valve for opening the closed circuit of hydrostatic transmission. Hence, there is no need of newly providing the bypass valve to result in that the number of parts is reduced and the oil passages are simplified.

Since the fixed swash plate 32 is provided as above-mentioned, there is no need of providing a thrust bearing holding portion. Also, since the bearing retainer is fixed to the junction surface of the transmission casing 2, so that, even when the transmission casing 1 is removed, a plurality of pistons at the cylinder block for the hydraulic motor do not escape, thereby facilitating maintenance or the like and assembly of the hydraulic motor.

Although several embodiments have been described, they are merely exemplary of the invention and not to be constructed as limiting, the invention being defined solely by the appended claims.

What is claimed is:

1. An axle driving apparatus characterized in that,
a right-hand axle and a left-hand axle are separately supported through bearings to a left transmission casing and a right transmission casing respectively, said transmission casings being horizontally divided,
a hydraulic pump connected to an engine and a hydraulic motor receiving oil pressure from said hydraulic pump and driven by said oil pressure to transmit a power to said axles, said hydraulic pump and motor being disposed within a casing formed by jointing said left and right transmission casings,
a pump mounting surface for said hydraulic pump is formed at the inner surface of a bottom wall of said left transmission casing and a pump shaft of said hydraulic pump is disposed perpendicularly with respect to said axles,
a motor mounting surface for said hydraulic motor is formed at the surface of a vertical wall erected in continuation of said bottom wall facing said right transmission casing and a motor shaft of said hydraulic motor is disposed in parallel to said axles,
a pair of horizontal oil passages communicating with a pair of crescent-shaped oil passages formed at said pump mounting surface are horizontally bored into said bottom wall from below said motor mounting surface of said vertical wall,
two vertical oil passages are bored in said vertical wall downwardly from the upper end face thereof so as to communicate with a pair of crescent-shaped oil passages formed at said motor mounting surface and communicate in an intersecting manner with said horizontal oil passages respectively, and
said horizontal oil passages and vertical oil passages are closed at their other ends respectively, thereby forming a closed circuit of said hydraulic pump and hydraulic motor.

2. An axle driving apparatus according to claim 1, characterized in that a lid for pivotally supporting an upper portion of said hydraulic pump disposed on said bottom wall is disposed at the upper end surface of said vertical wall, said lid closing said other ends of said vertical oil passages.

3. An axle driving apparatus according to claim 1, characterized in that a valve holder is fitted into an opening of each of said horizontal passages at said right transmission casing, a suction port through which operating oil collected in said transmission casing can flow into said valve holder is bore thereat, and valve bodies each allowing said operating oil to flow in only in the direction of said oil passages from said suction ports are disposed and used as check valves respectively.

4. An axle driving apparatus according to claim 3, characterized in that a tubular filter covers around said suction port at each of said valve holders.

5. An axle driving apparatus according to claim 3, characterized in that at said right transmission casing is formed a rib for partitioning the surrounding portion opposite to both said check valves, said rib being brought at its end face into close contact with the wall surface of said left transmission casing, and said rib is cut out in part to hold a filter so that operating oil in said transmission casing is guided within said rib through said filter.

6. An axis driving apparatus according to claim 3, characterized in that valve pushing rods for forcibly opening said valve bodies are slidably held in said tubular valve holders and project at the rear ends of said rods from one ends of said valve holders respectively, and a control lever supported at said right transmission casing and having an urging plate fixed at an end thereof and having a length which reaches both said valve pushing rods.

7. An axle driving apparatus according to claim 1, characterized in that at the same surface as the junction surface between said left and right transmission casings and at the surface of said left transmission casing is fixed a fixed swash plate for holding at a predetermined angle a thrust bearing abutting against pistons at said hydraulic motor.

* * * * *

UNITED STATES PATENT AND TRADEMARK OFFICE
CERTIFICATE OF CORRECTION

PATENT NO. : 4,899,541
DATED : February 13, 1990
INVENTOR(S) : Okada, et al.

It is certified that error appears in the above-identified patent and that said Letters Patent is hereby corrected as shown below:

Column 1, line 56, delete "in" and insert --on-- therefor;

Column 2, line 10, delete "13r" and insert --13R-- therefor;

line 31, delete "surfaces" and insert --surface-- therefor; and line 46, before "parallel", delete "i" and insert --in-- therefor.

Signed and Sealed this

Second Day of July, 1991

*Attest:*

HARRY F. MANBECK, JR.

*Attesting Officer*   Commissioner of Patents and Trademarks